(12) United States Patent
Takeda et al.

(10) Patent No.: US 10,903,948 B2
(45) Date of Patent: Jan. 26, 2021

(54) USER TERMINAL, RADIO COMMUNICATION SYSTEM AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/564,751

(22) PCT Filed: Apr. 8, 2016

(86) PCT No.: PCT/JP2016/061499
§ 371 (c)(1),
(2) Date: Oct. 6, 2017

(87) PCT Pub. No.: WO2016/163504
PCT Pub. Date: Oct. 13, 2016

(65) Prior Publication Data
US 2018/0115399 A1  Apr. 26, 2018

(30) Foreign Application Priority Data

Apr. 9, 2015 (JP) ................................. 2015-080324

(51) Int. Cl.
*H04L 5/00* (2006.01)
*H04W 72/04* (2009.01)
*H04W 72/12* (2009.01)

(52) U.S. Cl.
CPC ............ *H04L 5/0037* (2013.01); *H04L 5/001* (2013.01); *H04L 5/0016* (2013.01);
(Continued)

(58) Field of Classification Search
CPC ..... H04L 5/001; H04L 5/0053; H04L 5/0037; H04L 5/0016; H04W 72/048; H04W 72/121; H04W 72/12
See application file for complete search history.

(56) References Cited

U.S. PATENT DOCUMENTS

| 2011/0076962 A1* | 3/2011 | Chen ....................... H04L 5/001 455/68 |
| 2013/0021948 A1* | 1/2013 | Moulsley .............. H04W 24/02 370/254 |

(Continued)

OTHER PUBLICATIONS

International Search Report issued in corresponding application No. PCT/JP2016/061499 dated Jun. 28, 2016 (4 pages).

(Continued)

*Primary Examiner* — Elton Williams
(74) *Attorney, Agent, or Firm* — Osha Bergman Watanabe & Burton LLP

(57) ABSTRACT

The present invention is designed so that it is possible to prevent the number of times to perform blind decoding from increasing in cross-carrier scheduling in enhanced carrier aggregation. A user terminal can communicate with a radio base station by using six or more component carriers, and has a control section that exerts control so that, when cross-carrier scheduling is configured by the radio base station and the number of component carriers to be scheduled by a scheduling-source component carrier exceeds a predetermined value, a user terminal-specific search space is determined on a per component carrier basis based on higher layer signaling that configures a CIF (Carrier Indicator Field) value in association with a cell index.

4 Claims, 11 Drawing Sheets

(52) U.S. Cl.
CPC ......... *H04L 5/0053* (2013.01); *H04W 72/048* (2013.01); *H04W 72/121* (2013.01)

(56) References Cited

U.S. PATENT DOCUMENTS

| | | | |
|---|---|---|---|
| 2013/0128828 A1* | 5/2013 | Baldemair | H04L 5/0053 370/329 |
| 2014/0286275 A1* | 9/2014 | Park | H04L 5/0053 370/329 |
| 2017/0374569 A1* | 12/2017 | Lee | H04J 11/00 |

OTHER PUBLICATIONS

Written Opinion of the International Searching Authority issued in corresponding application No. PCT/JP2016/061499 dated Jun. 28, 2016 (3 pages).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart Japanese Patent Application No. 2017-511083, dated Jul. 28, 2020 (8 pages).

\* cited by examiner

USER TERMINAL, RADIO COMMUNICATION SYSTEM AND RADIO COMMUNICATION METHOD

TECHNICAL FIELD

The present invention relates to a user terminal, a radio communication system and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). The specifications of LTE-advanced have already been drafted for the purpose of achieving further broadbandization and higher speeds beyond LTE, and, in addition, for example, successor systems of LTE—referred to as, for example, "FRA" (future radio access)—are under study.

Also, the system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When the radio base stations to form a plurality of cells are substantially the same, the above-described carrier aggregation is applicable. On the other hand, when the radio base stations to form a plurality of cells are completely different, dual connectivity (DC) may be employed.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In the carrier aggregation of LTE Rel. 10/11/12, the number of component carriers that can be configured per user terminal is limited to maximum five. In LTE Rel. 13 and later versions, in order to achieve more flexible and faster wireless communication, and the number of component carriers that can be configured per user terminal is made six or greater, and enhanced carrier aggregation to bundle these component carriers is under study.

In existing carrier aggregation, support is provided so that one component carrier can carry out cross-carrier scheduling (CCS) with maximum five component carriers, including the subject component carrier. In enhanced carrier aggregation, there is a need to provided support so that one component carrier can carry out cross-carrier scheduling with six or more component carriers, including the subject component carrier.

In enhanced carrier aggregation, in which the number of component carriers that can be configured per user terminal is 6 or more, if cross-carrier scheduling is configured as in existing carrier aggregation, the number of times to perform blind decoding increases, and this increases the processing load on the user terminal.

The present invention has been made in view of the above points, and it is therefore an object of the present invention to provide a user terminal, a radio communication system and a radio communication method that are capable of preventing the number of times to perform blind decoding from increasing in proportion to the number of component carriers when cross-carrier scheduling is applied to enhanced carrier aggregation.

Solution to Problem

According to the present invention, a user terminal can communicate with a radio base station by using six or more component carriers, and has a control section that exerts control so that, when cross-carrier scheduling is configured by the radio base station and the number of component carriers to be scheduled by a scheduling-source component carrier exceeds a predetermined value, a user terminal-specific search space is determined on a per component carrier basis based on higher layer signaling that configures a CIF (Carrier Indicator Field) value in association with a cell index.

Advantageous Effects of Invention

According to the present invention, it is possible to prevent the number of times to perform blind decoding from increasing in cross-carrier scheduling in enhanced carrier aggregation.

DESCRIPTION OF EMBODIMENTS

Now, an embodiment of the present invention will be described in detail below with reference to the accompanying drawings. In LTE Rel. 13, enhanced carrier aggregation, in which no limit is placed on the number of component carriers that can be configured per user terminal, is under study. In enhanced carrier aggregation, for example, a study is in progress to bundle maximum 32 component carriers. With enhanced carrier aggregation, more flexible and faster wireless communication can be realized. In addition, by enhanced carrier aggregation, it is possible to bundle a large number of component carrier into an ultra-wide continuous band.

Existing carrier aggregation provides support so that one component carrier can carry out cross-carrier scheduling with maximum five component carriers, including the subject component carrier.

In enhanced carrier aggregation, there is a need to provided support so that one component carrier can carry out cross-carrier scheduling with maximum 32 component carriers, including the subject component carrier. Consequently, one PDCCH (Physical Downlink Control Channel) or EPDCCH (Enhanced PDCCH) need needs to support cross-carrier scheduling using more than five component carriers.

Figure 1A:
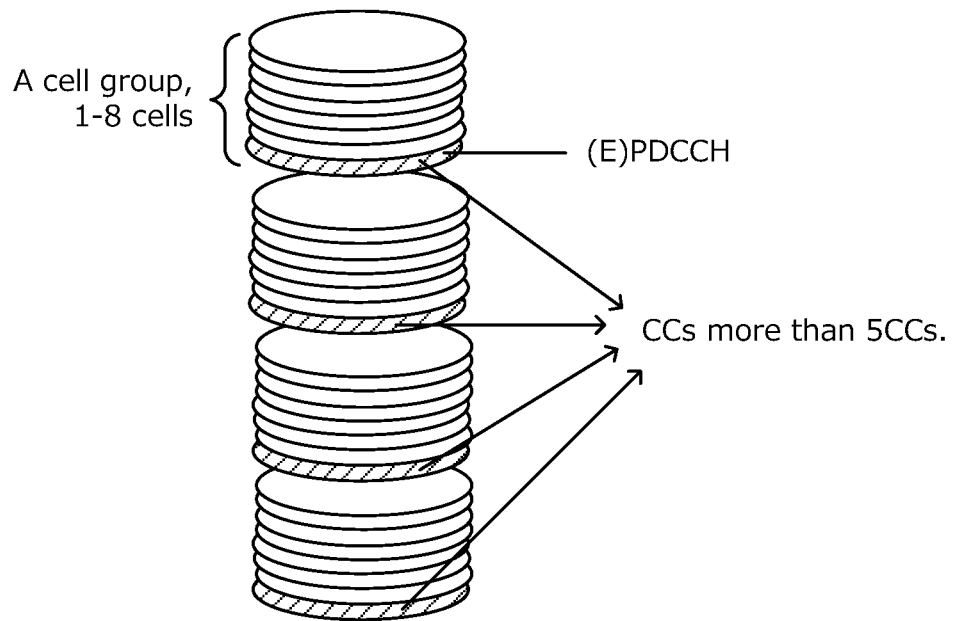
FIG. 1 provide diagrams to explain cross-carrier scheduling in enhanced carrier aggregation.

FIG. 1A shows an example, in which maximum 32 component carriers are divided into a plurality of cell groups, each comprised of one to eight component carriers, and cross-carrier scheduling is executed on a per cell group basis. One component carrier conducts cross-carrier scheduling with more than five component carriers (eight component carriers in FIG. 1A). By dividing component carriers into cell groups that are comprised of maximum eight component carriers, the existing 3-bit CIF (Carrier Indicator Field) can be used.

Figure 1B:
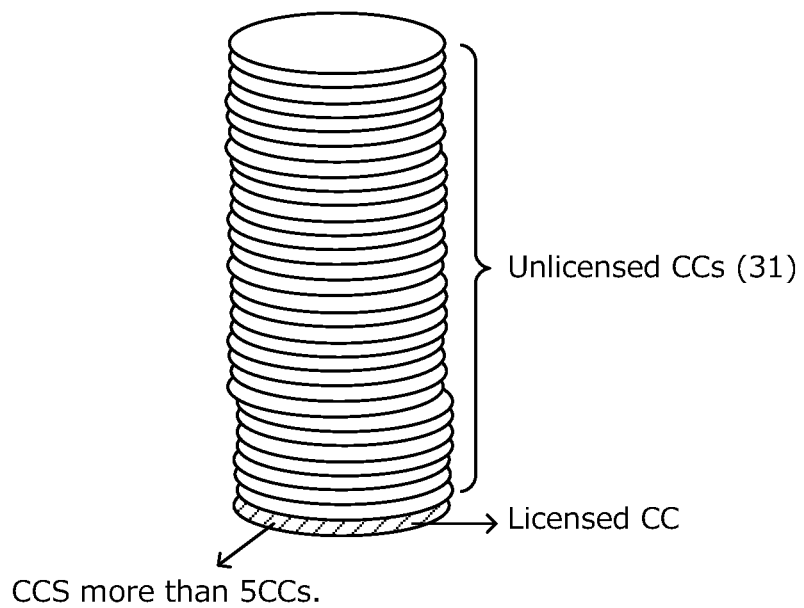

FIG. 1B shows an example in which one component carrier carries out cross-carrier scheduling with maximum 32 component carriers (32 component carriers in FIG. 1B). One component carrier that performs cross-carrier scheduling may be a component carrier in a licensed band, and the other 31 component carriers may be component carriers in unlicensed bands. A license band refers to a frequency band that is licensed to an operator, and an unlicensed band refers to a frequency band that does not require license.

Problems with cross-carrier scheduling in enhanced carrier aggregation include that the PDCCH or the EPDCCH has limited capacity, and that the number of times to try blind decoding of the PDCCH or the EPDCCH and the blocking rate increase.

In conventional cross-carrier scheduling, one PDCCH or EPDCCH supports cross-carrier scheduling of five component carriers. In cross-carrier scheduling in enhanced carrier aggregation, one PDCCH or EPDCCH supports cross-carrier scheduling of six or more component carriers (6 to 32 component carriers).

In cross-carrier scheduling, a user terminal applies blind-decoding to the PDCCH or the EPDCCH and detects DCI (Downlink Control Information), which is a control signal addressed to the subject terminal. The user terminal repeats blind decoding and cyclic redundancy check (CRC) while changing the control channel element (CCE: Control Channel Element) configuring the PDCCH or the control channel element (ECCE: Enhanced CCE) configuring the EPDCCH, and, when DCI addressed to the subject terminal is detected by cyclic redundancy check, performs control based on this DCI.

The user terminal does not blind-decode the entire range of the PDCCH or the EPDCCH in order to avoid an increase in processing load and performs blind decoding only in search spaces in the PDCCH or the EPDCCH. The common search spaces and user terminal-specific search spaces are defined as search spaces. The common search space is an area where all user terminals try blind decoding, and scheduling information such as broadcast information is transmitted here. A user terminal-specific search space is an area provided per user, and user-specific data scheduling information and the like are transmitted here. Cross-carrier scheduling control signals (DCI) can be transmitted only in user terminal-specific search spaces.

In the following description, the total number of CCEs (ECCEs) to which the PDCCH (EPDCCH) is allocated is 42 from CCE #0 to CCE #41, and L=1, 2, 4 and 8 are the aggregation levels of the CCEs (ECCEs) of the PDCCH (EPDCCH). Also, when one PDCCH (EPDCCH) occupies more than one CCE (ECCE), it is assumed that one PDCCH (EPDCCH) occupies a plurality of consecutive CCEs (ECCE). The aggregation level refers to the number of CCEs (ECCEs) occupied by one PDCCH (EPDCCH).

The starting location of a user terminal-specific search space can be defined by following equation 1 in LTE Rel. 8:

$$L\{(Y_k+m) \bmod \lfloor N_{CCE,k}/L \rfloor\}+i \qquad \text{(Equation 1)}$$

where L is the aggregation level, $Y_k=(A \cdot Y_{k-1}) \bmod D$, $Y_{-1}=n_{RNTI} \neq 0$, A=39827, D=65537, $k=\lfloor n_s/2 \rfloor$, $n_s$ is the slot index in the radio frame, m=0, . . . , $M^{(L)}-1$, $M^{(L)}$ is the number of candidate PDCCHs, $N_{CCE,k}$ is the total number of CCEs in the control portion in subframe k, and i=0, . . . , L−1.

Table 1 shows examples of search space starting locations (CCE numbers) determined by equation 1. In Table 1, when the aggregation level L=1, the search spaces starting locations (CCE numbers) are {12, 13, 14, 15, 16, 17}. When the aggregation level L=2, the search spaces starting locations (CCE numbers) are {24, 26, 28, 30, 32, 34}. When the aggregation level L=4, the search spaces starting locations (CCE numbers) are {24, 28}. When the aggregation level L=8, the search spaces starting locations (CCE numbers) are {8, 16}.

TABLE 1

| L = 1 | L = 2 | L = 4 | L = 8 |
|---|---|---|---|
| 12, 13, 14, 15, 16, 17 | 24, 26, 28, 30, 32, 34 | 24, 28 | 8, 16 |

The user terminal performs blind decoding six times at the aggregation level L=1, six times at the aggregation level L=2, twice at the aggregation level L=4, and twice at the aggregation level L=8, thus performing blind decoding 16 times in total, and, if DCI addressed to the subject terminal is detected by cyclic redundancy check in any of them, performs control based on this DCI.

The starting location of a user terminal-specific search spaces in the case of supporting cross-carrier scheduling is defined by following equation 2 in LTE Rel. 11:

$$L\{(Y_k+m+M^{(L)} \cdot n_u) \bmod \lfloor N_{CCE,k}/L \rfloor\}+i \qquad \text{(Equation 2)}$$

where L is the aggregation level, $Y_k=(A \cdot Y_{k-1}) \bmod D$, $Y_{-1}=n_{RNTI} \neq 0$, A=39827, D=65537, $k=\lfloor n_s/2 \rfloor$, $n_s$ is the slot index in the radio frame, m=0, . . . , $M^{(L)}-1$, $M^{(L)}$ is the number of candidate PDCCHs, $n_{CI}$ is the CIF value, $N_{CCE,k}$ is the total number of CCEs in the control portion in subframe k, and i=0, . . . , L−1.

Table 2 shows examples of search space starting locations (CCE numbers) determined by equation 2. Table 2, the values in the case of $n_{CI}$=0 are the same as in Table 1 above. When $n_{CI}$=1, for example, the search space starting locations (CCE numbers) at the aggregation level L=1 are {18, 19, 20, 21, 22, 23}, and do not overlap the CCE numbers at $n_{CI}$=0.

TABLE 2

| $n_{CI}$ | L = 1 | L = 2 | L = 4 | L = 8 |
|---|---|---|---|---|
| 0 | 12, 13, 14, 15, 16, 17 | 24, 26, 28, 30, 32, 34 | 24, 28 | 8, 16 |
| 1 | 18, 19, 20, 21, 22, 23 | 36, 38, 40, 0, 2, 4 | 32, 36 | 24, 32 |
| 2 | 24, 25, 26, 27, 28, 29 | 6, 8, 10, 12, 14, 16 | 0, 4 | 0, 8 |
| 3 | 30, 31, 32, 33, 34, 35 | 18, 20, 22, 24, 26, 28 | 8, 12 | 16, 24 |
| 4 | 36, 37, 38, 39, 40, 41 | 30, 32, 34, 36, 38, 40 | 16, 20 | 32, 0 |

Thus, DCI for different component carriers transmitted in one PDCCH or EPDCCH is configured so that search spaces do not overlap between identical aggregation levels.

The starting location of a user terminal-specific search space in the EPDCCH when cross-carrier scheduling is supported can be defined by following equation 3:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i \quad \text{(Equation 3)}$$

where L is the aggregation level, $Y_{p,k}=(A_p \cdot Y_{p,k-1}) \bmod D$, $Y_{p,-1}=n_{RNTI} \neq 0$, $A_0=39827$, $A_1=39829$, $D=65537$, $k=\lfloor n_s/2 \rfloor$, $n_s$ is the slot index in the radio frame, $m=0, \ldots, M_p^{(L)}-1$, $M_p^{(L)}$ is the number of candidate EPDCCH candidates at aggregation level L in EPDCCH-set p, $b=n_{CI}$, $n_{CI}$ is the CIF value, $N_{ECCE,p,k}$ is the total number of ECCEs in the control portion in EPDCCH-PRB-set p in subframe k, and $i=0, \ldots, L-1$.

The problem when applying the cross-carrier scheduling mechanism of existing carrier aggregation to cross-carrier scheduling in enhanced carrier aggregation is that the number of times to perform blind decoding increases in proportion to the number of component carriers and that the starting locations of the search spaces of different component carriers are in the same CCE numbers.

Table 3 shows examples of search space starting locations (CCE numbers) when cross-carrier scheduling is applied to 32 component carriers. CCE numbers in bold in Table 3 are CCE numbers that overlap between different $n_{CI}$ values (that is, CCE numbers that overlap between different component carriers). For example, in Table 3, at both $n_{CI}=0$ and $n_{CI}=7$, the search space starting locations (CCE numbers) at the aggregation level L=1 are {12, 13, 14, 15, 16, 17}, and overlap.

TABLE 3

| $n_{CI}$ | L = 1 | L = 2 | L = 4 | L = 8 |
|---|---|---|---|---|
| 0 | 12, 13, 14, 15, 16, 17 | 24, 26, 28, 30, 32, 34 | 24, 28 | 8, 16 |
| 1 | 18, 19, 20, 21, 22, 23 | 36, 38, 40, 0, 2, 4 | 32, 36 | 24, 32 |
| 2 | 24, 25, 26, 27, 28, 29 | 6, 8, 10, 12, 14, 16 | 0, 4 | 0, 8 |
| 3 | 30, 31, 32, 33, 34, 35 | 18, 20, 22, 24, 26, 28 | 8, 12 | 16, 24 |
| 4 | 36, 37, 38, 39, 40, 41 | 30, 32, 34, 36, 38, 40 | 16, 20 | 32, 0 |
| 5 | 0, 1, 2, 3, 4, 5 | 0, 2, 4, 6, 8, 10 | 24, 28 | 8, 16 |
| 6 | 6, 7, 8, 9, 10, 11 | 12, 14, 16, 18, 20, 22 | 32, 36 | 24, 32 |
| 7 | 12, 13, 14, 15, 16, 17 | 24, 26, 28, 30, 32, 34 | 0, 4 | 0, 8 |
| 8 | 18, 19, 20, 21, 22, 23 | 36, 38, 40, 0, 2, 4 | 8, 12 | 16, 24 |
| 31 | 30, 31, 32, 33, 34, 35 | 18, 20, 22, 24, 26, 28 | 32, 36 | 24, 32 |

When the number of component carriers on which cross-carrier scheduling is performed varies, the average number of times that a certain CCE for which blind decoding is performed by the user terminal is included in a given CC's search spaces is X times. When the aggregation level is L=1, X=0.71 if the number of component carriers on which cross-carrier scheduling is performed is 5, X=1.14 if the number of component carriers 8, and X=4.57 if the number of component carriers is 32. When the aggregation level is L=2, X=1.43 if the number of component carriers on which cross-carrier scheduling is performed is 5, X=2.29 if the number of component carriers 8, and X=9.14 if the number of component carriers is 32. If the value of X is 1 or less, this means that blind decoding does not overlap in the CCE of interest. As the value of X keeps increasing beyond 1, this means that blind decoding overlaps more seriously in a certain CCE.

Figure 2:
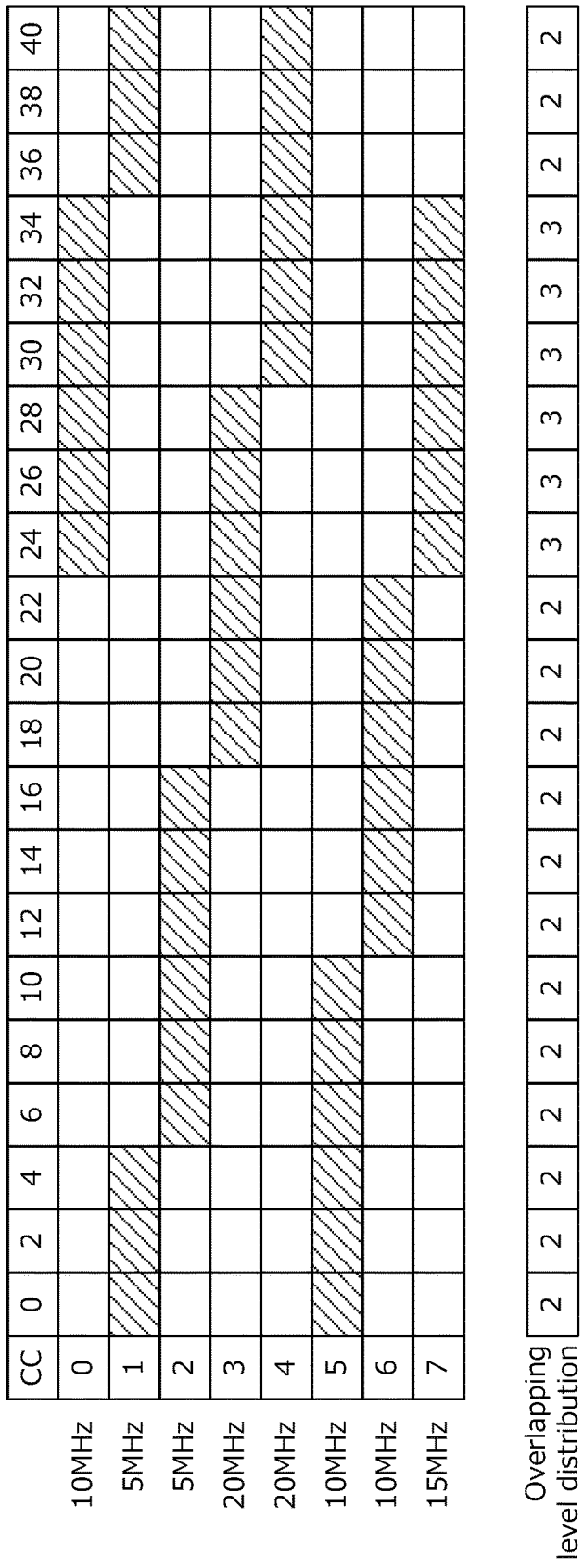
FIG. 2 is a diagram to show user terminal-specific search space candidates in a case where a conventional cross-carrier scheduling scheme is applied.

FIG. 2 is a diagram to show user terminal-specific search space candidates in a case where a conventional cross-carrier scheduling scheme is applied to eight component carriers (CC #0 to CC #7). In FIG. 2, a block having a hatched background represents a user terminal-specific search space candidate. In the example shown in FIG. 2, the total number of CCEs is 42, the aggregation level is L=2, and CC #0 is the scheduling component carrier. The values in the horizontal direction in FIG. 2 indicate the values at the head of the CCE indices being search space starting locations.

The same transmission mode (TM: Transmission Mode) is applied to all the component carriers shown in FIG. 2, but the bandwidth of each carrier is different. In FIG. 2, CC #0, CC #5 and CC #6 have a bandwidth 10 MHz, CC #1 and CC #2 have a bandwidth of 5 MHz, CC #3 and CC #4 have a bandwidth of 20 [MHz] and CC #7 has a bandwidth of 15 [MHz]. The same DCI format is used between component carriers having the same bandwidth.

In FIG. 2, in the case of CC #0, the user terminal performs blind decoding six times using the CCE numbers {24, 26, 28, 30, 32, 34} as search space starting locations. In the case of CC #1, the user terminal performs blind decoding six times using the CCE numbers {36, 38, 40, 0, 2, 4} as search space starting locations.

In FIG. 2, the CCE numbers {24, 26, 28} overlap the search space candidates for the three component carriers CC #0, CC #3 and CC #7. FIG. 2 shows the distribution of overlapping levels for each CCE number. For example, the overlapping level in the CCE number {24} is "3." The average value of the overlapping levels in FIG. 2 is "2.286."

In cross-carrier scheduling, instead of defining unique search spaces on a per component carrier basis based on component carrier indices and CIF indices, the present inventors have found out a configuration for dispersing search spaces among component carriers using higher layer signaling. Furthermore, the present inventors have found a configuration in which the user terminal detects the PDCCHs or the EPDCCHs of a plurality of component carriers by applying a common blind decoding sequence to a plurality of component carriers with overlapping search spaces. With these configurations, it is possible to prevent the number of times to perform blind decoding from increasing in proportion to the number of component carriers. Also, it is possible to prevent search spaces from gathering in a specific PDCCH (EPDCCH) area, and prevent the blocking rate from increasing.

First Example

The first example is configured to reduce the number of times to try blind decoding for user terminal-specific search spaces at each aggregation level. In other words, the first example is configured so that the number of user terminal-specific search space candidates at each aggregation level (that is, $M^{(L)}$ in equation 2 or $M_p^{(L)}$ in equation 3) is reduced.

Figure 3:
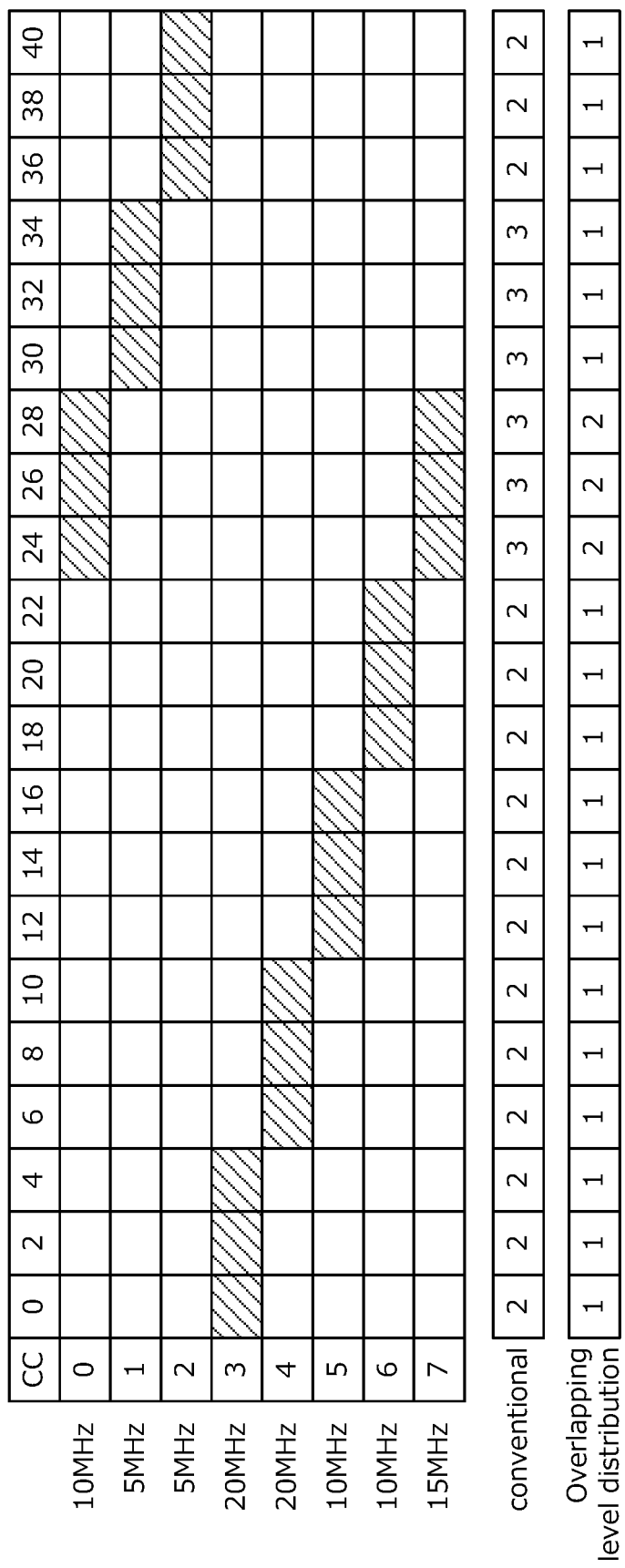
FIG. 3 is a diagram to show user terminal-specific search space candidates in the first example.

FIG. 3 is a diagram to show user terminal-specific search space candidates in the case where cross-carrier scheduling is applied to eight component carriers (CC #0 to CC #7) in the first example. In FIG. 3, a block having a hatched background indicates a candidate for a user terminal-specific search space. In the example shown in FIG. 3, the total number of CCEs is 42, the aggregation level L=2, and CC #0 is the scheduling component carrier. The values in the horizontal direction in FIG. 3 indicate the values at the head of the CCE indices being search space starting locations.

In FIG. 3, in the case of CC #0, the user terminal performs blind decoding three times using the CCE numbers {24, 26, 28} as search space starting locations. That is, the number of times to try blind decoding at the aggregation level L=2 is reduced from six to three. In this manner, by reducing the number of times to try blind decoding at each aggregation level, the overlapping level in each CCE number decreases as compared with the conventional example shown in FIG. 2. Therefore, the processing load on the user terminal can be reduced.

An example of user terminal control according to the first example will be described. Cross-carrier scheduling is configured in the user terminal by higher layer signaling. The user terminal exerts control such that, when the number of component carriers to be scheduled by a scheduling-source component carrier exceeds a predetermined value (for example, 5), the number of times to try blind decoding decreases at each aggregation level. Alternatively, when the user terminal is commanded to reduce the number of times to try blind decoding at each aggregation level by higher layer signaling, the user terminal exerts control so that the number of times to try blind decoding decreases.

Second Example

According to the first example, since the search space per user terminal or per component carrier is reduced, the blocking rate increases. Here, blocking refers to the situation in which there is no available space in the search space and the radio base station cannot make allocation. Therefore, the second example is configured so that the same $n_{CI}$ value is assigned to a plurality of component carriers having the same transmission mode and bandwidth.

The same DCI format is used between component carriers with the same transmission mode and bandwidth. When the same DCI format is used, in principle it is possible to try to detecting the DCI format of these component carriers with a single blind decoding. In this case, based on the value of the CIF bit included in the DCI format, it is possible to identify in which component carrier the DCI is to be scheduled. By using this skillfully, the second example makes it possible to reduce the number of times to try blind decoding.

Figure 4:
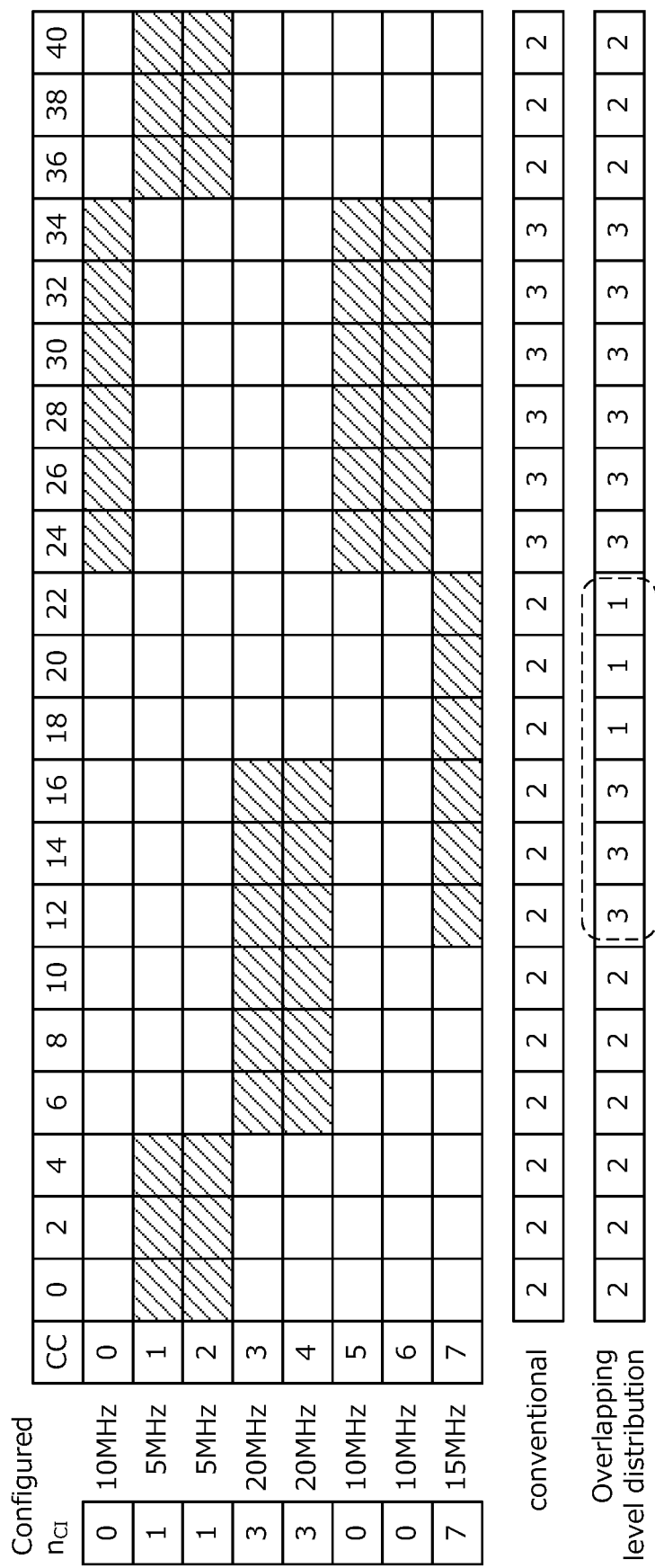
FIG. 4 is a diagram to show user terminal-specific search space candidates in a second example.

FIG. 4 is a diagram to show user terminal-specific search space candidates in the case where cross-carrier scheduling is applied to eight component carriers (CC #0 to CC #7) in the second example. In FIG. 4, a block having a hatched background indicates a candidate for a user terminal-specific search space. In the example shown in FIG. 4, the total number of CCEs is 42, the aggregation level L=2, and CC #0 is the scheduling component carrier. The values in the horizontal direction in FIG. 4 indicate the values at the head of the CCE indices being search space starting locations. All component carriers shown in FIG. 4 use the same transmission mode.

In FIG. 4, the same $n_{CI}$ value ($n_{CI}$=0) is assigned to CC #0, CC #5 and CC #6 having an equal bandwidth of 10 [MHz]. The starting locations of the search spaces of these component carriers are CCE numbers {24, 26, 28, 30, 32, 34} and are equal. Similarly, the same $n_{CI}$ value ($n_{CI}$=1) is assigned to CC #1 and CC #2 having an equal bandwidth of 5 [MHz]. The starting locations of the search spaces of these component carriers are CCE numbers {36, 38, 40, 0, 2, 4} and are equal. The same $n_{CI}$ value ($n_{CI}$=3) is assigned to CC #3 and CC #4 having an equal bandwidth of 20 [MHz]. The starting locations of the search spaces of these component carriers are CCE numbers {6, 8, 10, 12, 14, 16} and are equal. CC #7 with a bandwidth of 15 [MHz] is assigned $n_{CI}$=7. The starting locations of the search spaces of CC #7 are CCE numbers {12, 14, 16, 18, 20, 22}.

In the example shown in FIG. 4, the average value of the overlapping levels in each CCE number is "2.286," which is the same as the conventional example shown in FIG. 2.

An example of user terminal control according to the second example will be described. Cross-carrier scheduling is configured in the user terminal by higher layer signaling. When the number of component carriers scheduled by a scheduling-source component carrier exceeds a predetermined value (for example, 5), and, in some of these component carriers, the same transmission mode and bandwidth are used and therefore the model and payload of the DCI format are the same, the user terminal considers that the search spaces of these multiple component carriers are the same, at each aggregation level, and performs blind decoding accordingly.

In this case, the user terminal may only perform blind decoding of one component carrier between component carriers that are considered to have the same search space. For example, the user terminal can make the search space of the component carrier with the smallest secondary cell index (SCellIndex), among component carriers of the same DCI format model and payload, the search space to be considered as being the same among these multiple component carriers. Alternatively, the user terminal may use the search space of a component carrier specified by higher layer signaling as the search space to be considered as being the same among a plurality of component carriers.

In the example shown in FIG. 4, among component carriers having the same transmission mode and bandwidth (for example, CC #0, CC #5 and CC #6), the search space of CC #0 having the smallest cell index is made the search space to be considered as being the same among these multiple component carriers.

For a component carrier for which no specific indication is provided, the user terminal may decide the search space based on a conventional equation (equation 2 or equation 3) even when the transmission mode and the bandwidth are the same. That is, component carriers that use the same search space and component carriers that do not use the same search space can be configured by higher layer signaling.

Figure 5:
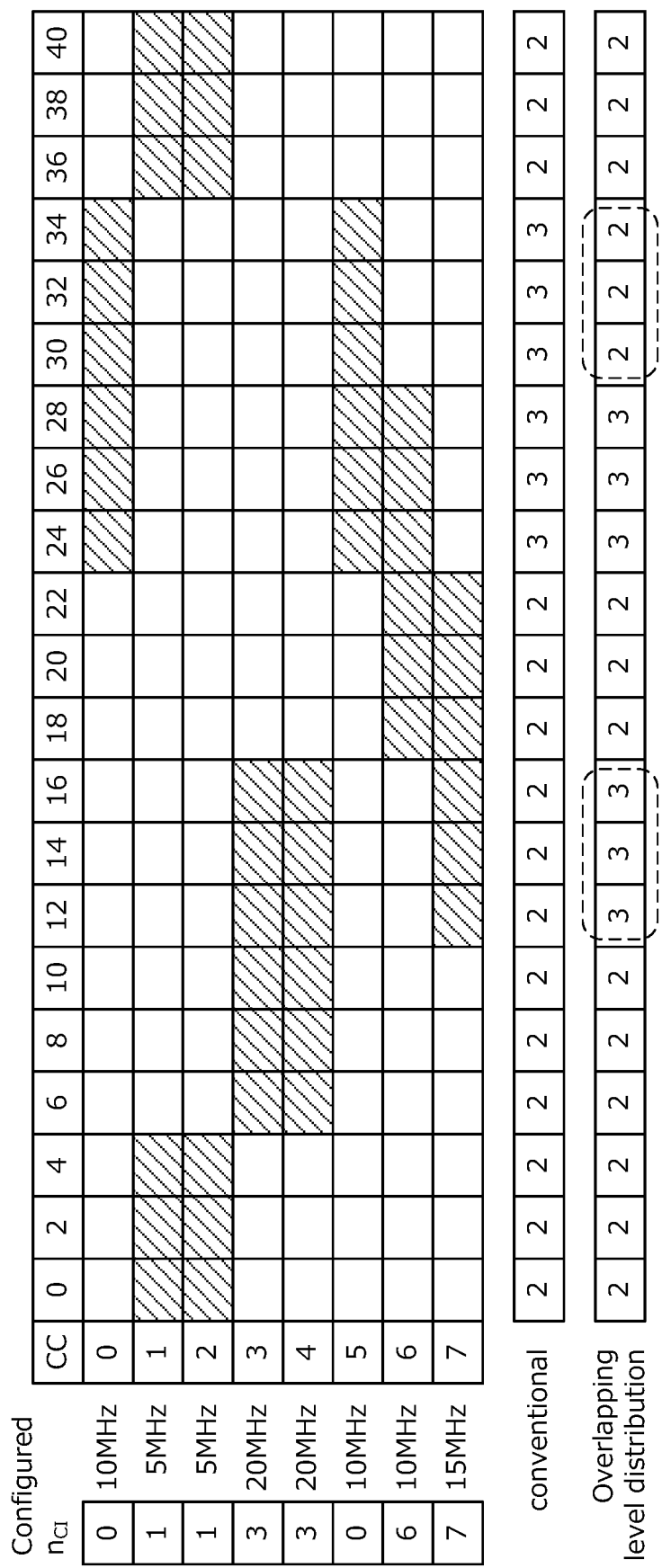
FIG. 5 is a diagram to show user terminal-specific search space candidates in the second example.

Referring to the example shown in FIG. 5, although CC #0, CC #5, and CC #6 have an equal bandwidth of 10 [MHz], by higher layer signaling, CC #6 is configured not to use the same search space with CC #0 and CC #5. Therefore, different $n_{CI}$ values ($n_{CI}$=0 or 6) are assigned to CC #0, CC #5 and CC #6, and therefore their search space starting locations differ.

In the example shown in FIG. 5, the average value of the overlapping levels in each CCE number is "2.286," which is the same as the conventional example shown in FIG. 2.

According to the second example, it is possible to reduce the processing load of the user terminal by reducing the number of times to try blind decoding, which increases in proportion to the number of component carriers.

Third Example

According to the second example, the DCI formats of a plurality of component carriers having the same CIF value ($n_{CI}$) are more likely to be biased toward specific CCE index locations, and therefore the blocking rate in the CCE indices in this range might increase. Accordingly, in the third example, the combinations of component carrier indices and CIF indices with $n_{CI}$ values are changed, and the changed value are reported to the user terminal by higher layer signaling (for example, RRC (Radio Resource Control) signaling). There may be a rule to change the combinations of component carrier indices and CIF indices with $n_{CI}$ values so that the user terminal-specific search spaces of component carriers having the same transmission mode and bandwidth partially overlap.

Figure 6:
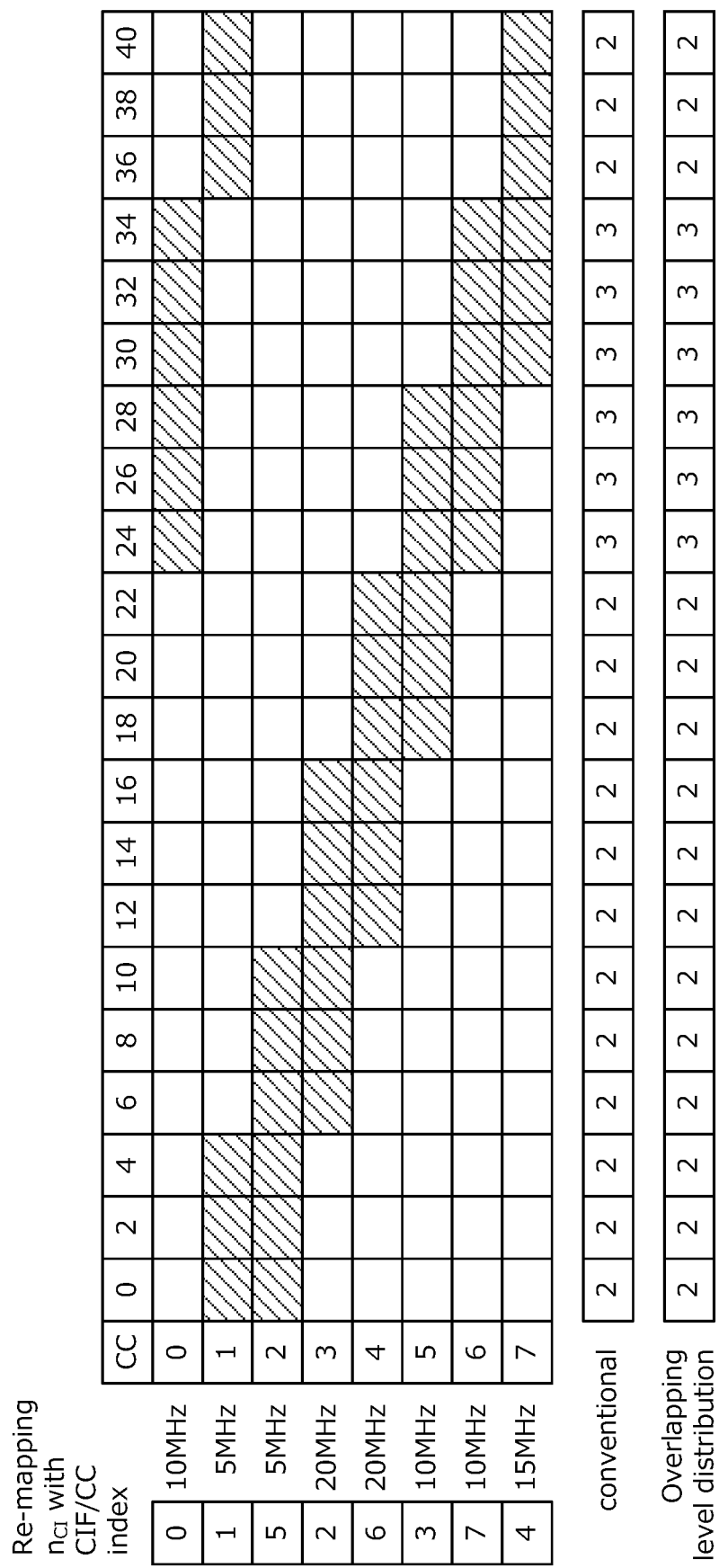
FIG. 6 is a diagram to show user terminal-specific search space candidates in a third example.

FIG. 6 is a diagram to show user terminal-specific search space candidates in the case where cross-carrier scheduling is applied to eight component carriers (CC #0 to CC #7) in the third example. In FIG. 6, a block having a hatched background indicates a candidate for a user terminal-specific search space. In the example shown in FIG. 6, the total number of CCEs is 42, the aggregation level L=2, and CC #0 is the scheduling component carrier. The values in the horizontal direction in FIG. 6 indicate the values at the head of the CCE indices being search space starting locations. All component carriers shown in FIG. 6 use the same transmission mode.

In the example shown in FIG. 6, $n_{CI}$ value=0 is assigned to CC #0, $n_{CI}$ value=1 is assigned to CC #1, $n_{CI}$ value=5 is assigned to CC #2, $n_{CI}$ value=2 is assigned to CC #3, $n_{CI}$ value=6 is assigned to CC #4, $n_{CI}$ value=3 is assigned to CC #5, $n_{CI}$ value=7 is assigned to CC #6 and $n_{CI}$ value=4 is assigned to CC #7. The user terminal performs blind decoding of user terminal-specific search spaces based on these $n_{CI}$ values.

In the example shown in FIG. 6, looking at CC #0, CC #5 and CC #6 having an equal bandwidth of 10 [MHz], the starting locations of the search spaces of these component carriers are CCE numbers {24, 26, 28}. There are no overlapping search space starting locations in the other CCE numbers, and thus search spaces are prevented from gathering in specific CCE index locations. The user terminal may only perform blind decoding of one component carrier in a portion where search spaces overlap. This makes it possible to reduce the number of times to try blind decoding.

In the example shown in FIG. 6, the distribution of the overlapping levels in each CCE number is the same as the conventional example shown in FIG. 2.

An example of user terminal control according to the third example will be described. Cross-carrier scheduling is configured in the user terminal by higher layer signaling. In this case, a combination of the $n_{CI}$ value and the value of the serving cell index (ServCellIndex) is configured in the user terminal by RRC signaling. In other words, unlike cross-carrier scheduling in existing carrier aggregation, the user terminal does not regard the $n_{CI}$ value to be equivalent to the value of the CIF or the serving cell index, and performs blind decoding based on the combination of the $n_{CI}$ value and the serving cell index value configured through RRC signaling.

When the number of component carriers where cross-carrier scheduling is configured exceeds a predetermined number of component carriers (for example, 5), the radio base station may configure the combination of the $n_{CI}$ value and the value of the serving cell index in all component carriers, or in component carriers with an indicator (for example, a serving cell index) showing a cell index of 5 or more. The radio base station may configure the combination of the $n_{CI}$ value and the value of the serving cell index in any component carrier regardless of the number of component carriers for where cross-carrier scheduling is configured.

If the combination of the $n_{CI}$ value and the value of the serving cell index is not configured by RRC signaling, the user terminal can determine that the $n_{CI}$ value is equivalent to the value of the CIF or the serving cell index.

(Variation)

The radio base station may assign the serving cell index (ServCellIndex) of each component carrier to be configured in the user terminal so that their search spaces are not biased too much, even though they might overlap. In this case, the radio base station needs send the $n_{CI}$ value and the value of the serving cell index to the user terminal in signaling.

(Structure of Radio Communication System)

Now, the structure of the radio communication system according to the present embodiment will be described below. In this radio communication system, a radio communication method using the above-described control method is applied.

Figure 7:
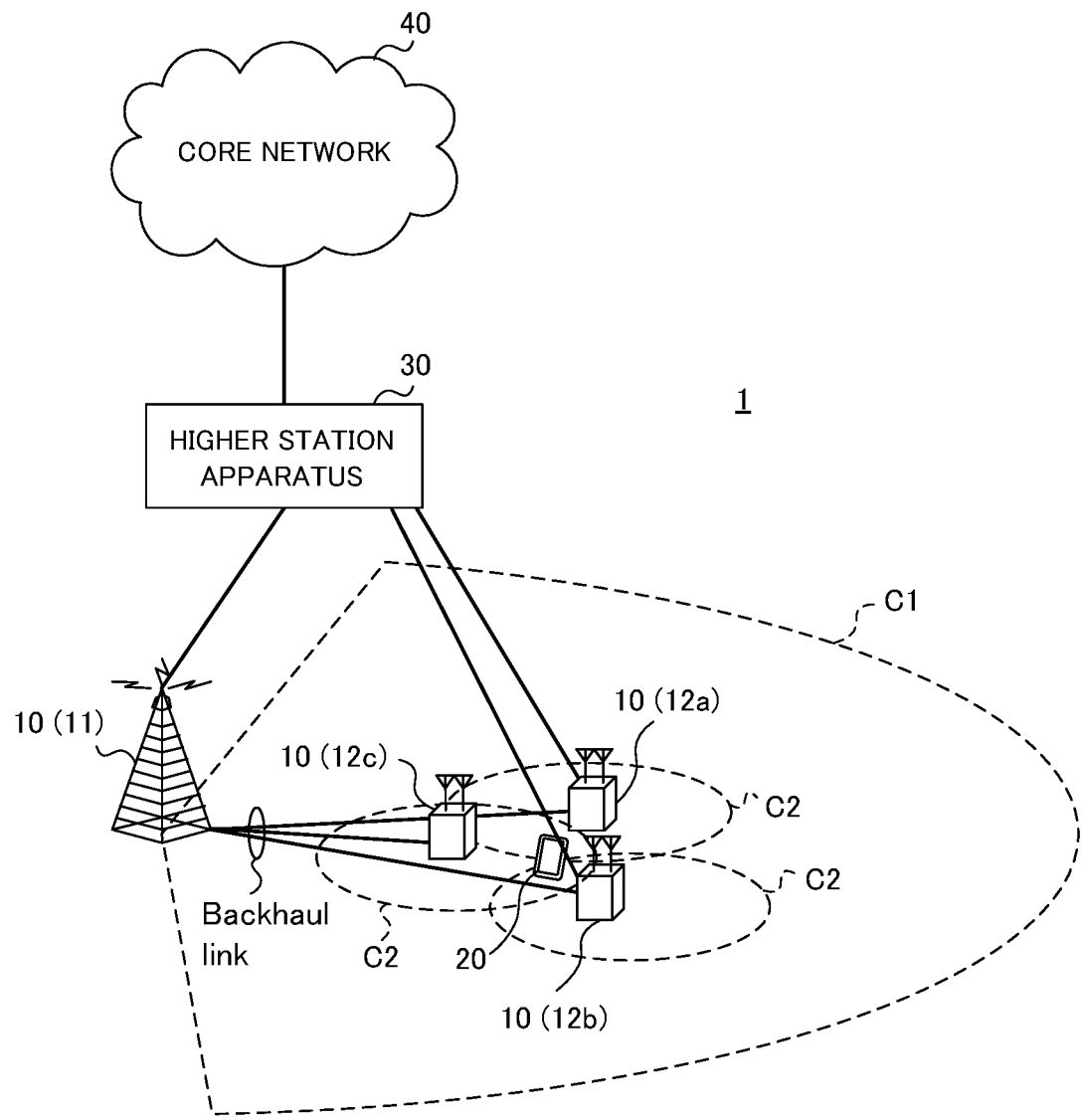
FIG. 7 is a diagram to show an example of a schematic structure of a radio communication system according to the present embodiment.

FIG. 7 is a diagram to show an example schematic structure of the radio communication system according to the present embodiment. This radio communication system can adopt one or both of carrier aggregation and dual connectivity to group a plurality of fundamental frequency blocks (component carriers) into one, where the LTE system bandwidth constitutes one unit.

As shown in FIG. 7, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 7, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 7.

For example, a mode may be possible in which the macro cell C1 is used in a licensed band and the small cells C2 are used in unlicensed bands. Also, a mode may be also possible in which part of the small cells C2 is used in a licensed band and the rest of the small cells C2 are used in unlicensed bands. The radio base stations 11 and 12 are connected with each other via an inter-base station interface (for example, optical fiber, the X2 interface, etc.).

The user terminals 20 can connect with both the radio base station 11 and the radio base stations 12. The user terminals 20 may use the macro cell C1 and the small cells C2, which use different frequencies, at the same time, by way of carrier aggregation or dual connectivity.

The higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared CHannel), which is used by each user terminal 20 on a shared basis, a downlink control channel (PDCCH (Physical Downlink Control CHannel), EPDCCH (Enhanced Physical Downlink Control CHannel), etc.), a broadcast channel (PBCH) and so on are used as downlink channels. User data, higher layer control information and predetermined SIB s (System Information Blocks) are communicated in the PDSCH. Downlink control information (DCI) is communicated using the PDCCH and/or the EPDCCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink channels. User data and higher layer control information are communicated by the PUSCH.

Figure 8:
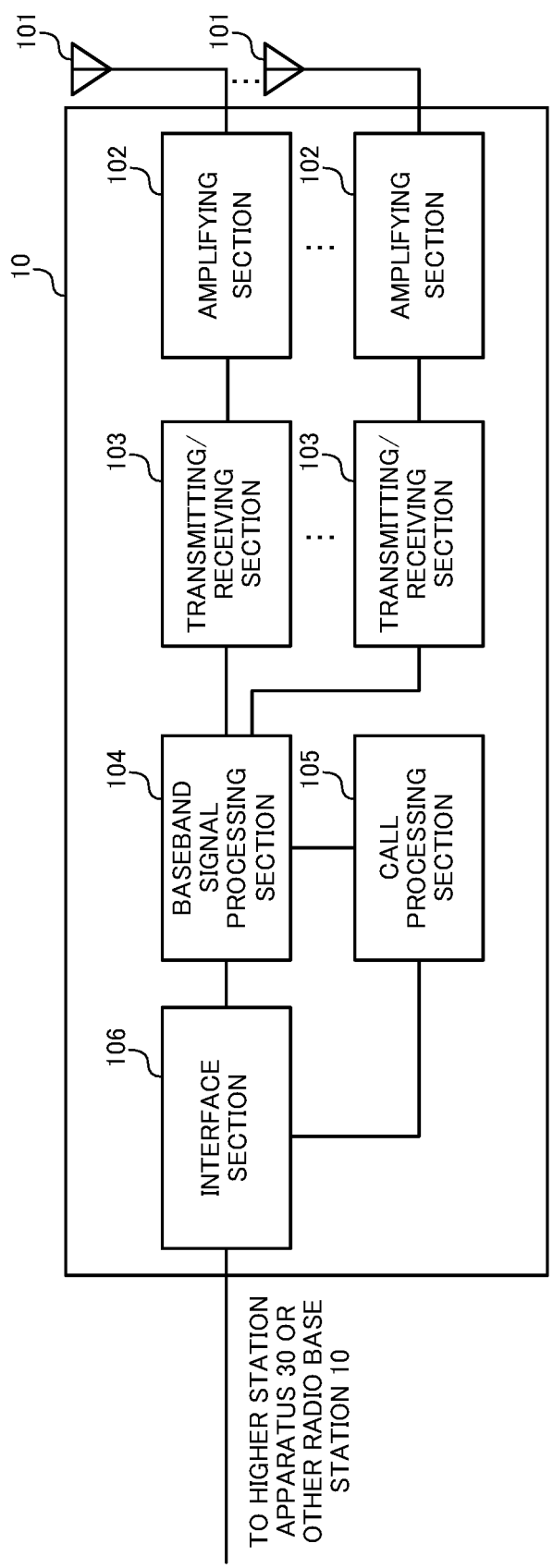
FIG. 8 is a diagram to show an example of an overall structure of a radio base station according to the present embodiment.

FIG. 8 is a diagram to show an overall structure of a radio base station 10 according to the present embodiment. As shown in FIG. 8, the radio base station 10 has a plurality of transmitting/receiving antennas 101 for MIMO (Multiple Input Multiple Output) communication, amplifying sections 102, transmitting/receiving sections (transmitting sections and receiving sections) 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103.

Furthermore, downlink control signals are also subjected to transmission processes such as channel coding and an inverse fast Fourier transform, and forwarded to each transmitting/receiving section 103.

Each transmitting/receiving section 103 converts downlink signals that are pre-coded and output from the baseband signal processing section 104 on a per antenna basis, into a radio frequency bandwidth. The radio frequency signals subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

As for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 9:
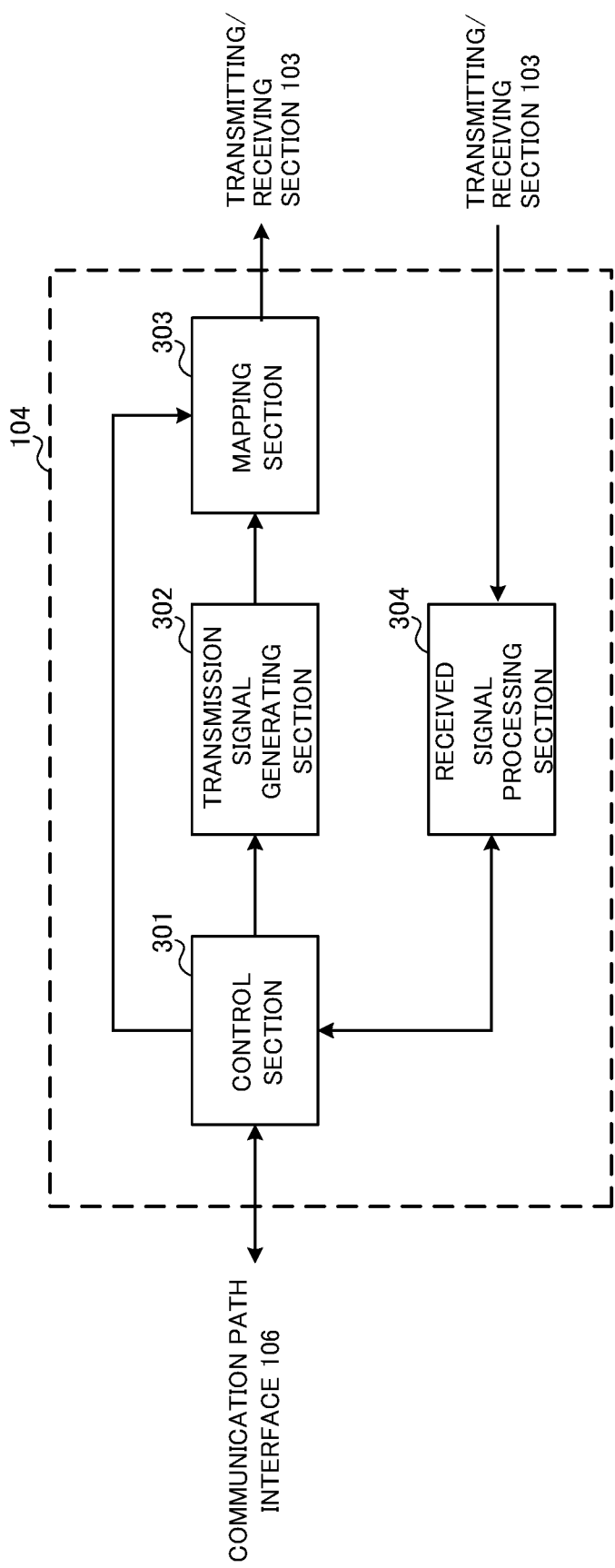
FIG. 9 is a diagram to show an example of a functional structure of a radio base station according to the present embodiment.

FIG. 9 is a diagram to show a principle functional structure of the baseband signal processing section 104 provided in the radio base station 10 according to the present embodiment. As shown in FIG. 9, the baseband signal processing section 104 provided in the radio base station 10 is comprised at least of a control section 301, a transmission signal generating section 302, a mapping section 303 and a received signal processing section 304.

The control section 301 controls the scheduling of downlink user data that is transmitted in the PDSCH, downlink control information that is communicated in one or both of the PDCCH and the enhanced PDCCH (EPDCCH), downlink reference signals and so on. Also, the control section 301 controls the scheduling (allocation control) of RA preambles communicated in the PRACH, uplink data that is communicated in the PUSCH, uplink control information that is communicated in the PUCCH or the PUSCH, and uplink reference signals. Information about the allocation control of uplink signals (uplink control signals, uplink user data, etc.) is reported to the user terminals 20 by using downlink control signals (DCI).

The control section 301 controls the allocation of radio resources to downlink signals and uplink signals based on command information from the higher station apparatus 30, feedback information from each user terminal 20 and so on. That is, the control section 301 functions as a scheduler. For the control section 301, a controller, a control circuit or a control device that can be described based on common understanding of the technical field to which the present invention pertains can be used.

The transmission signal generating section 302 generates downlink signals based on commands from the control section 301 and outputs these signals to the mapping section 303. For example, the downlink control signal generating section 302 generates downlink assignments, which report downlink signal allocation information, and uplink grants, which report uplink signal allocation information, based on commands from the control section 301. Also, the downlink data signals are subjected to a coding process and a modulation process, based on coding rates and modulation schemes that are selected based on channel state information (CSI) from each user terminal 20 and so on. For the transmission signal generating section 302, a signal generator or a signal generating circuit that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. For the mapping section 303, a mapper, a mapping circuit or a mapping device that can be described based on common understanding of the technical field to which the present invention pertains can be used.

The received signal processing section 304 performs the receiving process (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301. By using the received signals, the received signal processing section 304 may measure the received power (for example, the RSRP (Reference Signal Received Power)), the received quality (for example, the RSRQ (Reference Signal Received Quality)), channel states and so on. The measurement results may be output to the control section 301. The received signal processing section 304 can be constituted by a signal processor, a signal processing circuit or a signal processing device, and a measurer, a measurement circuit or a measurement device that can be described based on common understanding of the technical field to which the present invention pertains.

Figure 10:
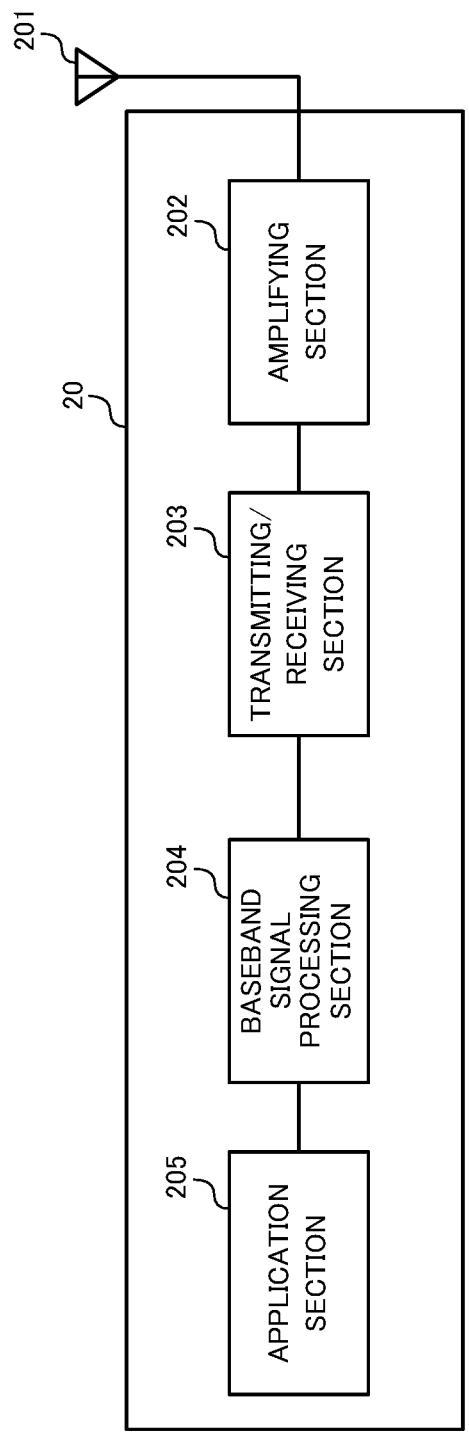
FIG. 10 is a diagram to show an example of an overall structure of a user terminal according to the present embodiment.

FIG. 10 is a diagram to show an overall structure of a user terminal 20 according to the present embodiment. As shown in FIG. 10, the user terminal 20 has a plurality of transmitting/receiving antennas 201 for MIMO communication, amplifying sections 202, transmitting/receiving sections (transmitting sections and receiving sections) 203, a baseband signal processing section 204 and an application section 205.

A radio frequency signal that is received the transmitting/receiving antenna 201 is amplified in the amplifying section 202 and converted into the baseband signal through frequency conversion in the transmitting/receiving section 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205. For the transmitting/receiving section 203, a transmitter/receiver, a transmitting/receiving circuit or a transmitting/receiving device that can be described based on common understanding of the technical field to which the present invention pertains can be used.

Uplink user data is input from the application section 205 to the baseband signal processing section 204. In the baseband signal processing section 204, a retransmission control (HARQ) transmission process, channel coding, precoding, a discrete Fourier transform (DFT) process, an inverse fast Fourier transform (IFFT) process and so on are performed, and the result is forwarded to transmitting/receiving section 203. The baseband signal that is output from the baseband signal processing section 204 is converted into a radio frequency band in the transmitting/receiving section 203. After that, the amplifying section 202 amplifies the radio frequency signal having been subjected to frequency conversion, and transmits the resulting signal from the transmitting/receiving antenna 201.

Figure 11:
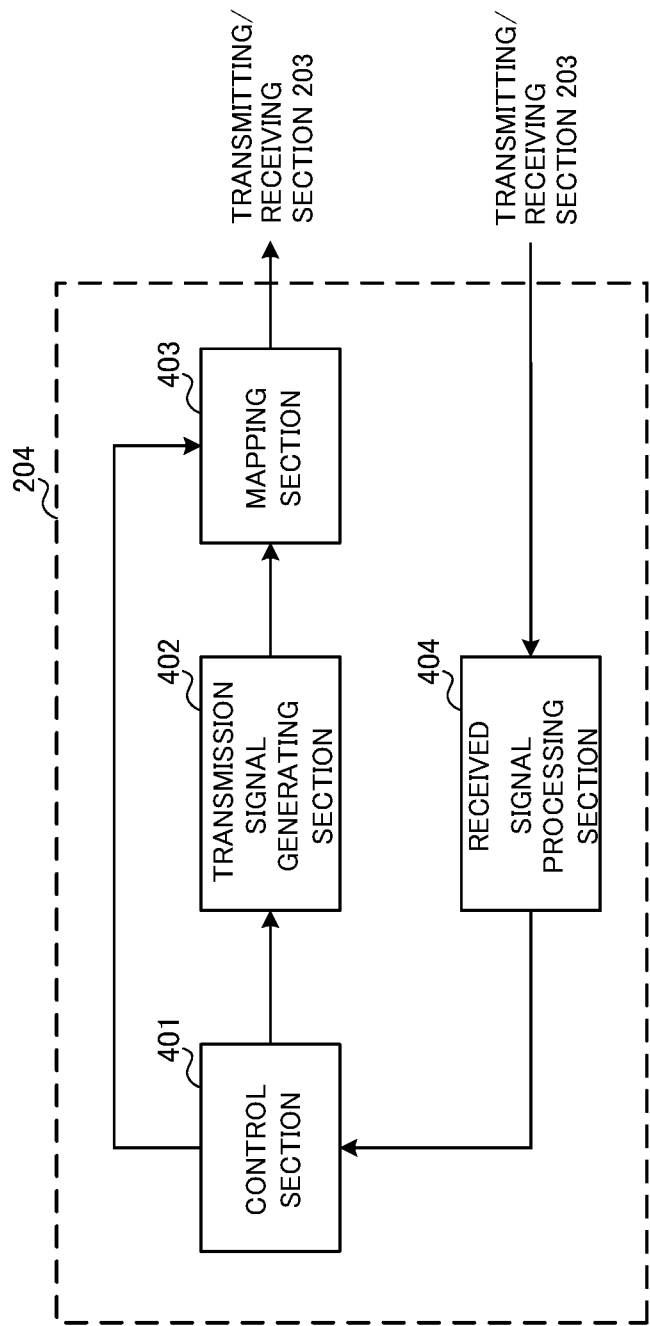
FIG. 11 is a diagram to show an example of a functional structure of a user terminal according to the present embodiment.

FIG. 11 is a diagram to show a principle functional structure of the baseband signal processing section 204 provided in the user terminal 20. Note that, although FIG. 11 primarily shows functional blocks that pertain to characteristic parts of the present embodiment, the user terminal 20 has other functional blocks that are necessary for radio communication as well. As shown in FIG. 11, the baseband signal processing section 204 provided in the user terminal 20 is comprised at least of a control section 401, a transmission signal generating section 402, a mapping section 403 and a received signal processing section 404.

For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. To be more specific, the control section 401 controls the transmission signal generating section 402 and the mapping section 403.

When cross-carrier scheduling is configured by the radio base station 10 and the number of component carriers to be scheduled by a scheduling-source component carrier exceeds a predetermined value (for example, 5), the control section 401 exerts control so that user terminal-specific search space candidates are determined on a per component carrier basis based on higher layer signaling that configures predetermined CIF values and predetermined cell indices in association with each other.

The transmission signal generating section 402 generates uplink signals based on commands from the control section 401, and outputs these signals to the mapping section 403. For example, the transmission signal generating section 402 generates uplink control signals such as delivery acknowledgement signals (HARQ-ACKs) and channel state information (CSI) based on commands from the control section 401. Also, the transmission signal generating section 402 generates uplink data signals based on commands from the control section 401. For example, when an uplink grant is included in a downlink control signal that is reported from the radio base station 10, the control section 401 commands the transmission signal generating section 402 to generate an uplink data signal. For transmission signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving process (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401. The received signal processing section 404 outputs, for example, broadcast information, system information, paging information, RRC signaling, DCI and so on, to the control section 401.

Also, the received signal processing section 404 may measure the received power (RSRP), the received quality (RSRQ) and channel states, by using the received signals. The measurement results may be output to the control section 401.

The received signal processing section 404 can be constituted by a signal processor, a signal processing circuit or a signal processing device, and a measurer, a measurement circuit or a measurement device that can be described based on common understanding of the technical field to which the present invention pertains.

Note that the block diagrams that have been used to describe the above embodiment show blocks in function units. These functional blocks (components) may be implemented in arbitrary combinations of hardware and software.

The means for implementing each functional block is not particularly limited. That is, each functional block may be implemented with one physically-integrated device, or may be implemented by connecting two or more physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. The radio base stations 10 and user terminals 20 may be implemented with a computer device that includes a processor (CPU), a communication interface for connecting with networks, a memory and a computer-readable storage medium that stores programs.

The processor and the memory are connected with a bus for communicating information. The computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. The radio base stations 10 and user terminals 20 may include input devices such as input keys and output devices such as displays.

The functional structures of the radio base stations 10 and user terminals 20 may be implemented by using the above-described hardware, may be implemented by using software modules to be executed on the processor, or may be implemented by combining both of these. The processor controls the whole of the user terminals by running an operating system. The processor reads programs, software modules and data from the storage medium into the memory, and executes various types of processes. These programs have only to be programs that make a computer execute each operation that has been described with the above embodiments. For example, the control section 401 of the user terminals 20 may be stored in a memory and implemented by a control program that operates on the processor, and other functional blocks may be implemented likewise.

Note that the present invention is by no means limited to the above embodiments and can be carried out with various changes. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2015-080324, filed on Apr. 9, 2015, including the specification, drawings and abstract, is incorporated herein by reference in its entirety.

The invention claimed is:

1. A terminal comprising:
   a receiver that performs decoding for a physical downlink control channel (PDCCH); and
   a processor that determines, in accordance with higher layer signaling, a number of times the receiver performs the decoding per aggregation level,
   wherein, when carrier aggregation is deployed, the processor receives a downlink control information (DCI) of a second cell in a search space for a DCI of a first cell,
   wherein a format and a payload of the DCI of the first cell are the same as a format and a payload of the DCI of the second cell,
   wherein the processor determines the search space for the DCI of the first cell based on the higher layer signaling that configures a carrier indicator field (CIF) value,
   wherein, when carrier aggregation is deployed and when the format and the payload of the DCI of the first cell are the same as the format and the payload of the DCI of the second cell that is different from the first cell, the processor monitors the search space for the DCI of the first cell, receives the DCI of the second cell by monitoring only the search space of the DCI of the first cell, and refrains from monitoring a search space in the second cell, and
   wherein the processor determines the search space for the DCI of the first cell based on the higher layer signaling.

2. The terminal according to claim 1, wherein, if the processor receives the DCI of the second cell in the search space for the DCI of the first cell, the processor reduces the number of times that the receiver performs decoding for the search space for the DCI of the second cell.

3. The terminal according to claim 1, wherein the processor refrains from monitoring a search space in the second cell when receiving the DCI of the second cell in the search space for the DCI of the first cell.

4. A radio communication method for a terminal, the radio communication method comprising:
   performing decoding for a physical downlink control channel (PDCCH); and
   determining, in accordance with higher layer signaling, a number of times of performing the decoding per aggregation level,
   wherein, when carrier aggregation is deployed, the terminal receives a downlink control information (DCI) of a second cell in a search space for a DCI of a first cell,
   wherein a format and a payload of the DCI of the first cell are the same as a format and a payload of the DCI of the second cell,
   wherein the terminal determines the search space for the DCI of the first cell based on the higher layer signaling that configures a carrier indicator field (CIF) value,
   wherein, when carrier aggregation is deployed and when the format and the payload of the DCI of the first cell are the same as the format and the payload of the DCI of the second cell that is different from the first cell, the terminal monitors the search space for the DCI of the first cell, receives the DCI of the second cell by monitoring only the search space of the DCI of the first cell, and refrains from monitoring a search space in the second cell, and
   wherein the terminal determines the search space for the DCI of the first cell based on the higher layer signaling.

* * * * *